Figure 1:
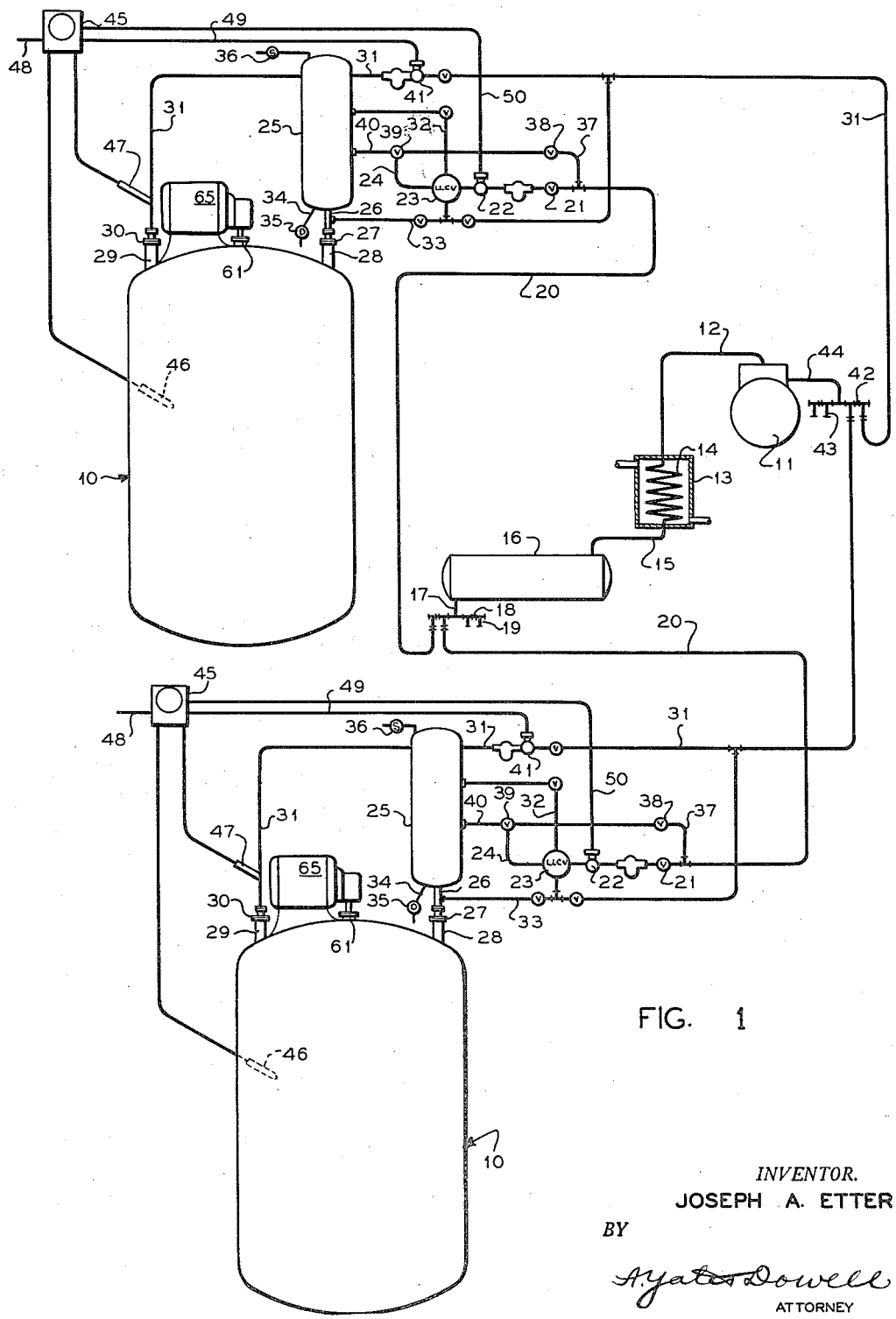

INVENTOR.
JOSEPH A. ETTER

Sept. 25, 1956　　　J. A. ETTER　　　2,764,476
REACTION TANK AND THERMO-REGULATOR SYSTEM
Filed April 3, 1952　　　5 Sheets-Sheet 3

INVENTOR.
JOSEPH A. ETTER
BY
A. Yates Dowell
ATTORNEY

Sept. 25, 1956            J. A. ETTER            2,764,476

REACTION TANK AND THERMO-REGULATOR SYSTEM

Filed April 3, 1952            5 Sheets-Sheet 4

INVENTOR.
JOSEPH A. ETTER
BY
ATTORNEY

Sept. 25, 1956  J. A. ETTER  2,764,476
REACTION TANK AND THERMO-REGULATOR SYSTEM
Filed April 3, 1952  5 Sheets-Sheet 5
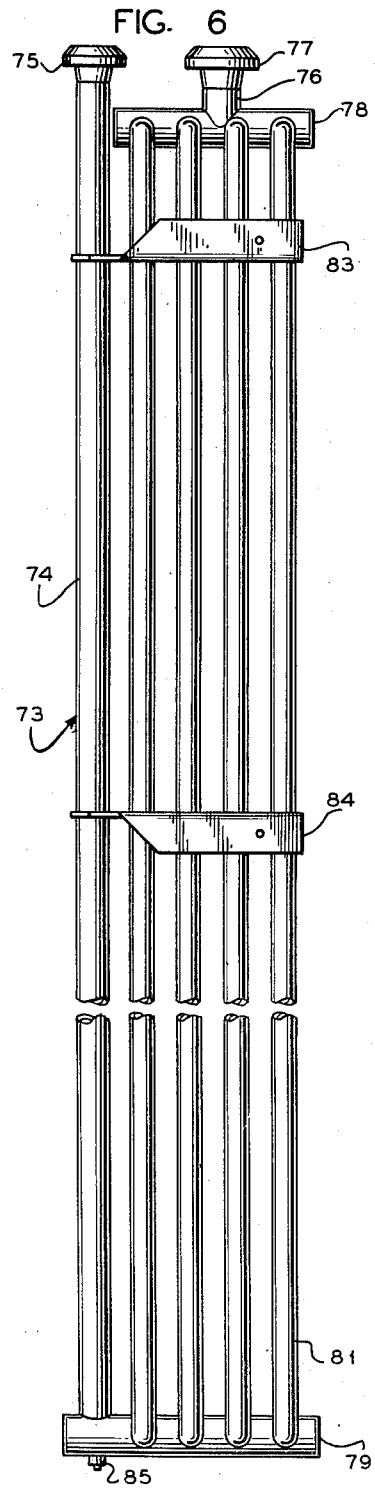
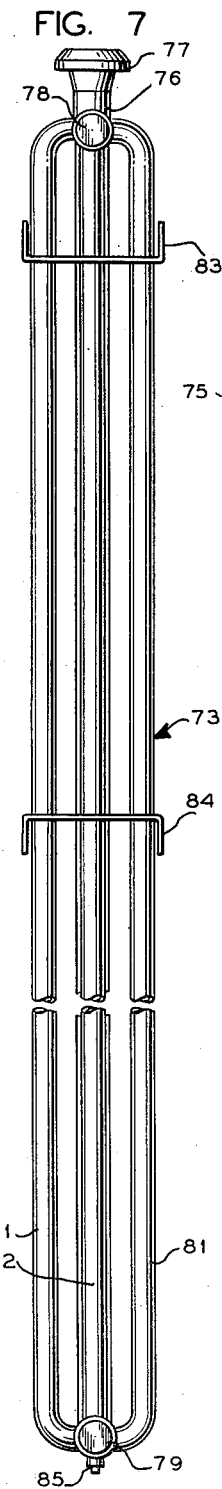
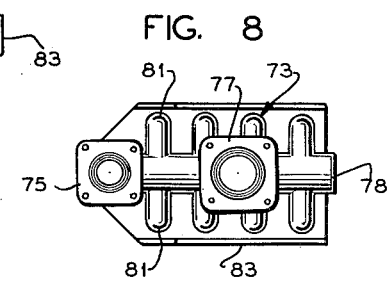
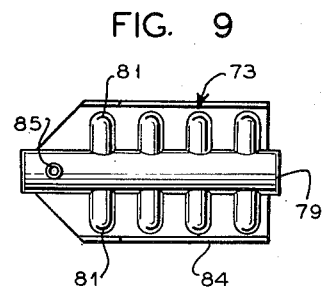
INVENTOR.
JOSEPH A. ETTER
BY
A. Yates Dowell
ATTORNEY United States Patent Office 2,764,476
Patented Sept. 25, 1956

2,764,476

REACTION TANK AND THERMO-REGULATOR SYSTEM

Joseph A. Etter, Cincinnati, Ohio, assignor to Frick Company, Incorporated, Waynesboro, Pa., a corporation of Pennsylvania Application April 3, 1952, Serial No. 280,441

13 Claims. (Cl. 23—285)

This invention relates to chemical processes and apparatus utilized in the carrying out of such processes. More particularly the invention relates to the control of chemical processes, the chemical reactions thereof, and the apparatus employed, such control being necessary not only to retard but to actually control the speed and quality of reaction through temperature and/or pressure in order to obtain uniformity thereof as well as to attain high uniform quality of the end product by preventing undesired and inappropriate or improper reactions with the resultant waste of the ingredients or damage to the end product, injury to equipment, and possible injury to personnel.

In certain chemical apparatus, as for example that used in the manufacture of synthetic rubber as well as in other industries, difficulty has been experienced in obtaining the reaction sought and at the desired rate. These reactions have consumed a very substantial amount of time and any attempt to appreciably accelerate the rate of such reactions has resulted in run-away temperatures and pressures, spoiling the process and causing a waste of the ingredients involved as well as injury to the equipment and sometimes to the personnel.

Numerous efforts have been made to solve the problem and prevent run-away temperatures and pressures including the cooling of the exterior of the containers in which the reactions occur. This surface or jacket cooling has not been satisfactory because it limits the available surface and rate of total heat transfer. Coils and other heat transfer devices have also been tried experimentally but these have not resulted in any particular success due to the lack of sufficient capacity and rigidity to withstand the high ebullition of heat and agitation speeds of the materials in the reactor chamber which are necessary to effect a suitable reaction and furthermore with these devices it has not been possible to obtain effective refrigerant control in such heat transfer devices.

Another problem is presented by the nature of the reactor or pressure vessel in which the chemical reaction is effected and by the character and use of the agitators therein. Such pressure vessel has only a relatively small opening affording access to the interior of the same thus making it difficult if not apparently impossible to install effective cooling coil units in the interior of the reactor or to provide direct cooling for the contents of the same. This is true because the operation of means to agitate the ingredients within the reactor may cause vibration of any coils which might be introduced as well as interfere with the effectiveness of the agitation and controls employed, particularly of a continuous circuit.

It is an object of this invention to provide an apparatus and process for effecting and controlling chemical reactions in manufacturing processes and in a manner to overcome the problems above enumerated.

Another object of the invention is to provide a system capable of producing and maintaining suitable and uniform temperatures in one or more reactors reducing the reaction time required as well as the energy required for operation.

A further object of the invention is the provision of chemical reaction apparatus in which the nature, rate and/or pressure temperature of the reaction is accurately controlled by controlling the withdrawal of the heat produced by such reaction, thereby maintaining uniformity of pressure and/or temperature within the reactor.

Another object of the invention is to provide a cooling system having a series of evaporators or cooling coils with relatively large heat transfer surface areas and of a character particularly appropriate for use in pressure type reactors into which the only access is the usual relatively small manhole.

Another object is to provide equipment with cooling coils which not only provides maximum fluid contact with the outer heat transfer surface of the pipe with maximum temperature differential but also which offers minimum flow resistance without increase in evaporator pressure.

A further object of the invention is the provision of chemical reaction apparatus having cooling coils installed therein and in which the operation of such coils is not adversely affected by sudden changes in temperature within the reactor and also in which such coils continue to operate with substantially maximum efficiency under extremely wide load variations.

A further object of the invention is the provision of chemical reaction apparatus having cooling coils installed therein and in which the maximum height of the apparatus is maintained at a minimum while still providing for substantial flooding of the cooling coils with refrigerant under all conditions of temperature and load normally encountered in the use of such apparatus.

A still further object of the invention is the provision of a reactor in which the evaporator or cooling coils may be completely prefabricated with a minimum number of joints and in which the individual parts thereof may be conveniently introduced into the reactor through the normal size manhole and the parts conveniently assembled and suspended within the reactor out of contact with the vitreous enamel or glass lining, and when thus suspended will be rigidly supported in position against shifting movement and/or vibration due to the agitation of the contents of the reactor but without in any way impeding expansion and contraction due to temperature changes.

Figure 2:
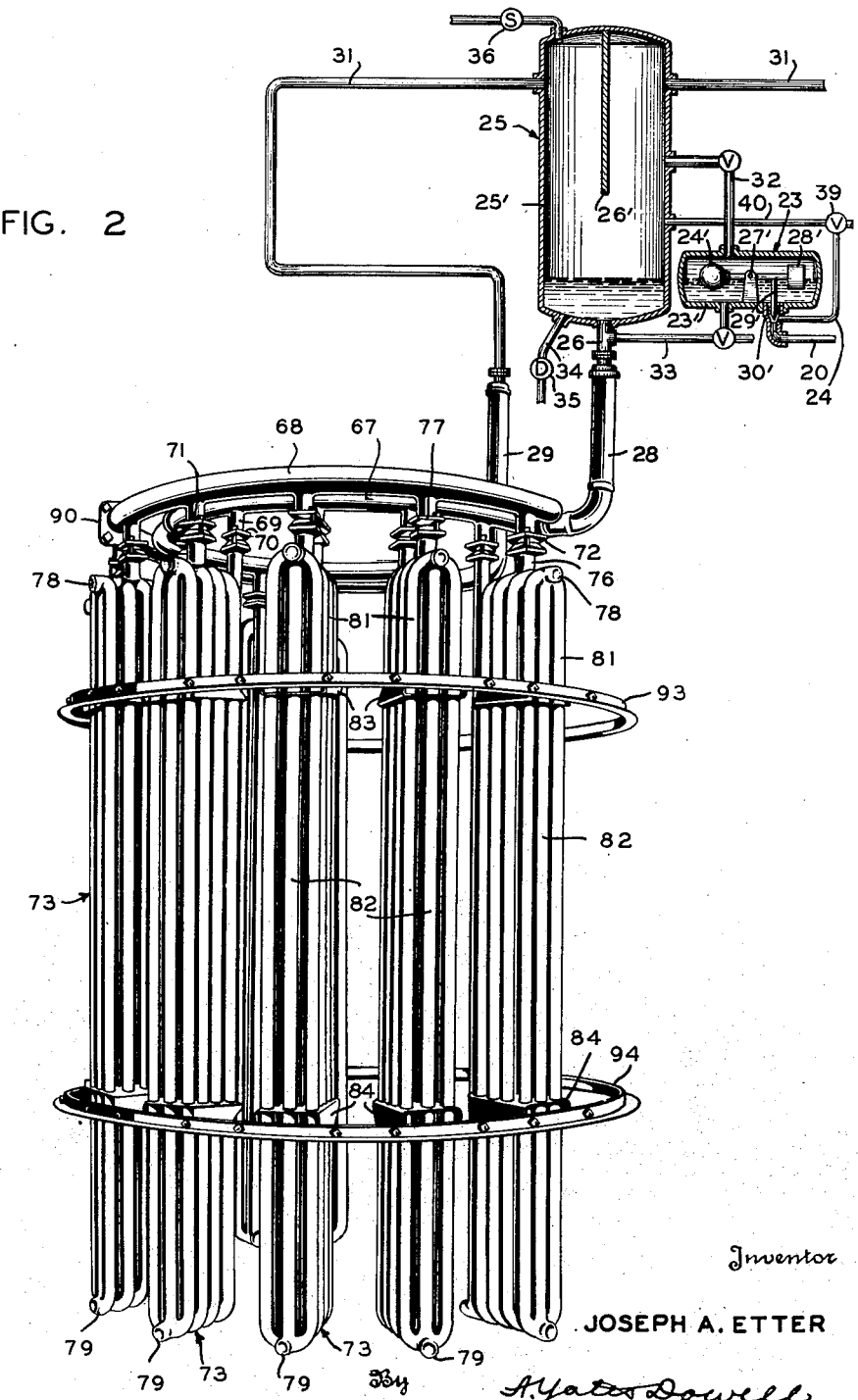
Figure 3:
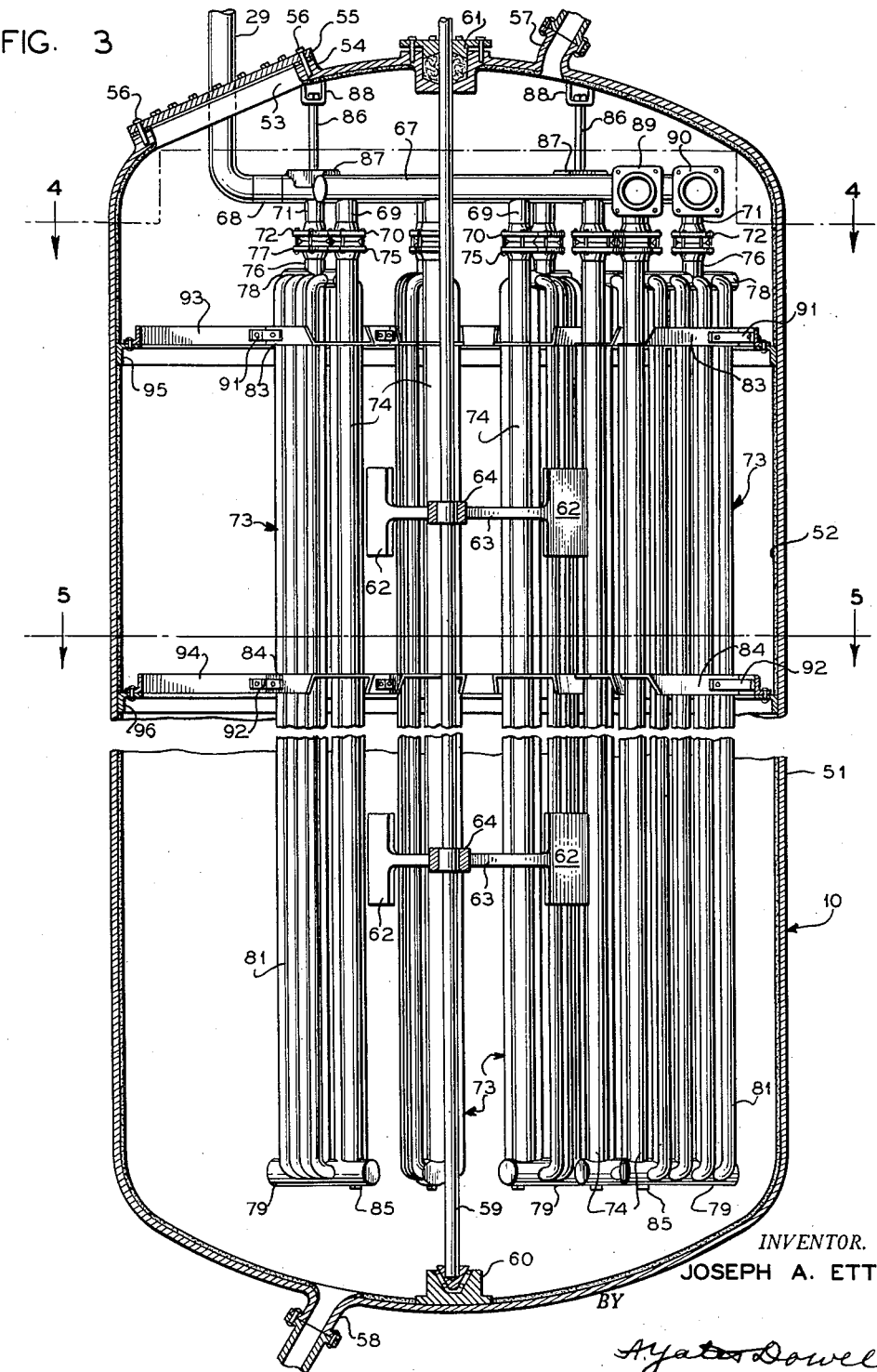
Figure 4:
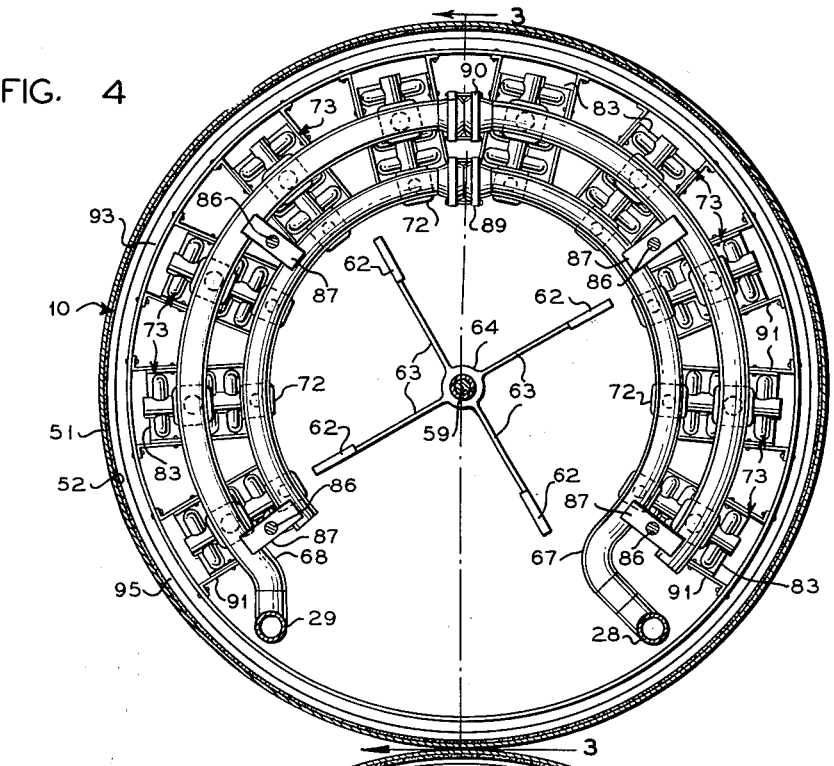
Figure 5:
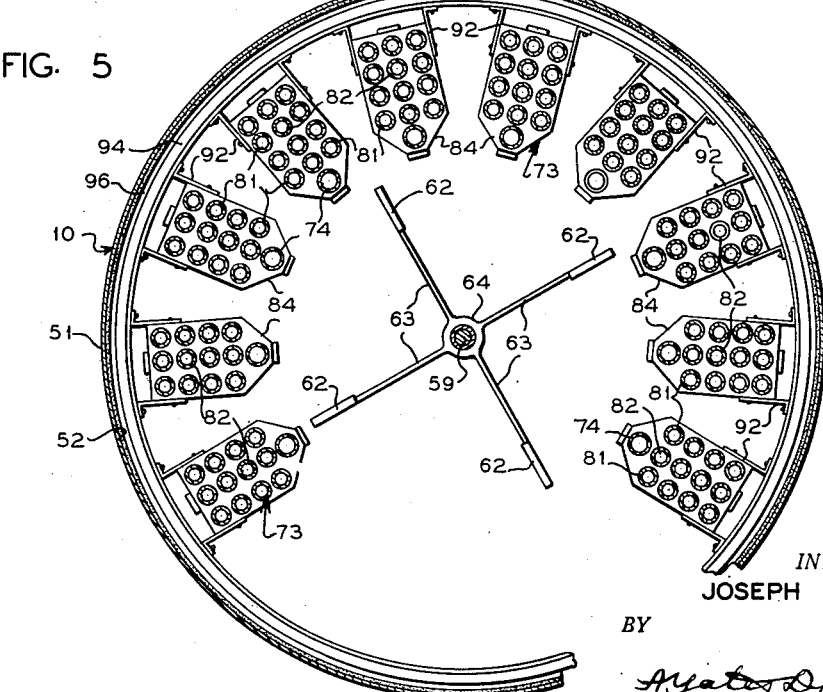

Further objects and advantages of the invention will be apparent from the following description taken in conjunction with the accompanying drawings, wherein:

Fig. 1 is a diagrammatic view illustrating a system in accordance with the present invention;

Fig. 2, a perspective view of the coil and header assembly together with an accumulator and float control therefor connected in the relationship which they occupy in the system and with parts in section for greater clarity;

Fig. 3, a vertical section through the reactor on the line 3—3 of Fig. 4;

Fig. 4, a section on the line 4—4 of Fig. 3;

Fig. 5, a section on the line 5—5 of Fig. 3;

Fig. 6, a front elevation of one of the units of the cooling coil;

Fig. 7, a side elevation of the cooling coil unit of Fig. 6;

Fig. 8, a top plan view of the cooling coil unit of Fig. 6; and

Fig. 9, a bottom plan view of the cooling coil unit of Fig. 6.

Briefly stated the invention comprises one or more reactors and associated equipment which operate under a pressure other than atmospheric and have vitreous enamel or glass linings. For cooling, a refrigeration system is employed having an evaporator composed of cooling coils suspended within the several reactors with controls for the refrigerant in the coils of each reactor operating in accordance with temperature or pressure conditions within the reactor, it having been determined that vertically disposed uniflow fluid coils supplied from a single header at the top as well as a single outlet header and with such cooling unit coils each composed of individual groups of parallel tubes, as for example three in number, located so that a plane through these tubes is normal to the radius of the shell of the reactor are particularly suitable for this use. This method of application of the tubes of the evaporator in an upright staggered pattern permits maximum contact with the materials undergoing reaction and contributes to the efficient agitation of such materials by means of agitator elements disposed within the reactor and driven by an independent exteriorly mounted motor by means of a shaft extending through a stuffing box in the top wall of the reactor. The disposition of the vertical tubes does not interfere with the normal rolling contact of the contained batch with the outer shell of the reactor and the power required for agitation is not substantially increased. This is because of the high heat transfer efficiency of the cooling coils which permits reducing the agitation speed to the minimum required for proper mixing of the materials undergoing reaction.

In addition to the area of the coils within the reactor which provides maximum contact with the outer surfaces of the tubes, the specific arrangement of the tubes in each cooling coil provides minimum resistance to refrigerant flow and permits complete flooding through the feed line into the bottom header with upward gas removal through such coils. This does not appreciably increase cooling coil pressure losses at high-load temperature differential. It provides for complete contact of refrigerant with the inside coil surfaces from the initial high temperature condition down to the lowest reaction end temperature. The complete cooling coil with outside float refrigerant control recirculating accumulator provides the greatest temperature differential obtainable with standard coil surfaces without the danger of slugs of refrigerant being carried back to the compressor.

This arrangement of cooling coils and recirculating accumulator together with an outside float refrigerant control permits the design and construction of an apparatus having a minimum height dimension since the head of refrigerant required to obtain complete flooding of the coils is relatively low, it only being necessary that the accumulator be mounted directly above the reactor and connected to the refrigerant inlet. The height of the apparatus of this system is considerably less than that which would be required to obtain the necessary head of refrigerant which would permit complete flooding of the coils in a continuous circuit system. This of ocurse constitutes a distinct advantage where vertical space in a plant is at a premium.

With continued reference to the drawings in Fig. 1 is shown an apparatus for carrying out a controlled chemical reaction and in which a plurality of reactors 10 may be provided there being two such reactors shown in the drawing but obviously any desired number may be employed. Chemical reaction taking place with the reactors 10 is controlled by a refrigeration system which includes a compressor 11 delivering compressed refrigerant through a conduit 12 to a condenser 13 having a heat exchange coil 14 from which coil liquid refrigerant flows through a conduit 15 into a receiver 16.

The outlet of the receiver 16 is connected by a conduit 17 with a manifold or header 18 and such header is provided with connections 19 to supply as many reactors as may be desired up to the capacity of the refrigerating system.

Since the refrigeration system for controlling the temperature in each reactor 10 is the same, only one such system will be described but it is to be understood that such system will be duplicated for each reactor used.

Liquid refrigerant from the header or manifold 18 is supplied by conduit 20 having a manual control valve 21 to an automatic shut-off valve 22 to a liquid level control valve 23 and through a conduit 24 to an accumulator 25. The level of liquid refrigerant in the accumulator 25 is maintained substantially constant by the liquid level control valve 23.

The reactor 10 is provided with cooling coils disposed in the interior thereof and the specific structure and arrangement of such coils will be later described. These coils comprise the evaporator of the refrigeration system and are supplied with liquid refrigerant from the accumulator 25 through a conduit 26 connected by a flanged joint and stuffing box 27 with an inlet conduit 28 which extends into the interior of the reactor 10 and connects with and supplies refrigerant to a header forming a part of the cooling coils. An outlet for the refrigerant vapor from the cooling coils within the reactor 10 is provided in the form of a conduit 29 which is connected to a second header disposed within the reactor 10, this outlet conduit 29 being connected through a flanged joint and stuffing box 30 with a conduit 31 which connects to the accumulator 25 adjacent the upper end thereof.

Refrigerant either in the form of a gas or in the form of a gas with entrained liquid refrigerant therein may pass or be withdrawn through the conduit 31 which forms a suction line into the upper portion of the accumulator 25 and any entrained liquid in the refrigerant will flow by gravity to the lower portion of the accumulator 25 and be recirculated through the cooling coils within the reactor 10. An equalizing conduit 32 is connected to the upper portion of the accumulator 25 and the liquid level control valve 23 and a second equalizing conduit 33 is connected to the outlet conduit 26 of the accumulator 25 and the liquid level control valve 23.

As shown in Fig. 2 the accumulator 25 may well comprise a closed tank or receptacle 25' and within the upper portion of this tank is disposed a vertical baffle plate 26'. Baffle 26' serves to isolate the refrigerant flowing into the accumulator through conduit or suction line 31 from the gaseous refrigerant flowing outwardly from the accumulator 25 through the suction line 31 to the compressor 11. This structure results in the complete separation of any entrained liquid refrigerant in the gas flowing from the cooling coils to the accumulator 25 and prevents any slugs of such liquid refrigerant from entering the suction line 31 and being drawn into the compressor 11. Obviously the separated liquid refrigerant will flow by gravity from the upper portion of the accumulator 25 to the lower portion thereof.

The structure of the liquid level control valve 23 is also shown in Fig. 2 and this may well comprise a closed chamber 23' located exteriorly of the accumulator 25 and disposed at such a level that with the chamber 23' substantially one half full of liquid refrigerant the liquid level in the accumulator 25 will be at the proper height. The level of liquid in the chamber 23' is maintained by means of the equalizing conduits 32 and 33 connected to the chamber 23' and to the accumulator 25 above and below the liquid level therein. Disposed within the chamber 23' is a float 24' pivotally mounted at 27' and being provided with a counterweight 28' which permits movement of the float 24' as a result of minute changes in the level of liquid within the chamber 23'. Actuated by movement of float 24' is a valve plunger 29' forming part of a float valve 30' which controls the flow of liquid refrigerant from liquid supply conduit 20 to inlet conduit 24 of the accumulator 25. It will thus be seen that as the liquid level in the accumulator 25 lowers that the level in chamber 23' will likewise be lowered causing operation of float 24' and opening of the valve 30' to permit the flow of additional liquid refrigerant from the supply conduit 20 through the inlet conduit 24 into the accumulator 25 thus replacing the liquid withdrawn therefrom and maintaining the level of such liquid refrigerant substantially constant.

It should be noted that the accumulator 25 is located directly above the reactor 10 and that the accumulator 25 is connected to the cooling coils disposed within the reactor 10 through a relatively short conduit. This results in an apparatus requiring relatively little headroom and in view of the nature of the cooling coils which will be later described. This arrangement provides a sufficient head to accomplish complete flooding of the cooling coils with liquid refrigerant and without the necessity of locating the accumulator at a relatively great height above the cooling coils.

If desired the accumulator 25 may be provided with a drain 34 controlled by a valve 35 for permitting withdrawal of the contents of the accumulator 25 including any oil or other foreign matter which may have collected therein and the accumulator likewise may be provided with a safety release valve 36 to prevent excess pressure building up therein and endangering the apparatus and personnel.

Since at times it may be desirable to supply liquid refrigerant to the accumulator 25 without regard to the operation of the liquid level control valve 23, a bypass conduit 37 is connected to the liquid supply conduit 20, bypass conduit 37 being controlled by a manually operated valve 38 and a three-way valve 39 which selectively controls the supply of liquid refrigerant either from the supply conduit 24 or from the bypass conduit 37 through the conduit 40 into the accumulator 25.

The suction line 31 also serves to withdraw the gaseous refrigerant from the upper portion of the accumulator 25 through a control valve 41 from whence the gaseous refrigerant flows to a return manifold or header 42 having a plurality of additional inlet connections 43 and being connected through a suction line 44 with the suction side of the compressor 11. Valve 41 is of the throttling or modulating type and is provided with pressure responsive means which may be preset to any desired pressure, this pressure responsive means operating to control the pressure of fluid flowing through the valve 41. This valve is also supplied with pneumatically actuated or other means for controlling the operation of the valve in response to other conditions. The manner in which the pneumatic control operates will be presently described.

Since it is imperative that the temperature of the materials reacting within the reactor 10 be accurately controlled, means is provided in the form of a controller 45 which may also be recording, the operation of which is controlled by a temperature or pressure responsive element 46 disposed within the reactor 10 and a second temperature or pressure responsive element 47 disposed in the gaseous refrigerant discharge line 31. As disclosed in Fig. 1 a pneumatic supply conduit 48 is connected to a suitable source of air pressure and to the recording controller 45 and such air under reduced pressure is supplied through a conduit 49 to the control valve 41. The pressure utilized to actuate the control valve 41 is controlled by operation of the controller 45. The shutoff valve 22 is also connected to the recording controller 45 through a conduit 50 and under certain conditions as described below the controller 45 will operate to provide sufficient air pressure in the conduit 50 to close the valve 22 and prevent flow of liquid refrigerant from the supply conduit 20 to the accumulator 25.

During the progress of normal reaction in the reactor 10 the evaporation temperature is controlled by means of the valve 41 operating in response to the controller 45, valve 41 controlling the back pressure in the accumulator 25 and thus controlling the rate of withdrawal of heat from the batch of materials undergoing reaction in the reactor 10. As noted above however, the built-in pressure control in the valve 41 is preset to maintain the back pressure in accumulator 25 at such a value that in no case will the temperature within the reactor 10 decrease to such a point that water in the batch of materials undergoing reaction therein will be frozen and temperatures below such lower limit are prevented by this automatic pressure control in the valve 41 regardless of the operation of recording controller 45.

In the event that reaction of the batch of materials in the reactor 10 suddenly ceases resulting in a sudden decrease in temperature within the reactor and a sudden decrease in the refrigeration load the valve 22 will operate in response to actuation of the controller 45 to close the liquid supply conduit 20 and thus prevent a sudden influx of liquid refrigerant to the accumulator 25 and the coils within the reactor 10. This will prevent sudden inadvertent flooding of the system with consequent undesired results. Upon resumption of the reaction within the reactor 10 the valve 22 will open in response to operation of controller 45 and the refrigeration system will resume normal operation under control of the valve 41.

The above described refrigeration system and its manner of control represents a highly efficient and relatively simple means for controlling the chemical reaction of a batch of materials disposed within a reactor. Since the temperature of such reaction is highly critical and since the control thereof is reflected directly in the time required for the reaction and in the quality of the resultant product it will be obvious that any system which will accurately and automatically control such reaction and at the same time prevent run-away temperatures represents a distinct advantage and step forward in the art.

With particular reference to Figs. 2 to 9, the specific structure of the reactor and the refrigerating coils disposed therein and their relation to the accumulator and liquid level control valve is shown. The reactor 10 may comprise a container or chamber formed of an outer shell 51 which may be conveniently constructed of welded sections, this shell being coated on the interior thereof with a lining 52 of glass, vitreous enamel or other suitable substance which will not be affected by the corrosive materials included in the batch undergoing reaction within the reactor 10. The shell 51 may be provided in the upper end thereof with an access opening or manhole 53 formed by an outwardly extending flange 54 to which may be secured in fluid tight relation a cover 55. This cover may be secured in place by screw threaded fastening means or the like 56 extending therethrough and into the flange 54. Materials to be treated within the reactor 10 may be introduced thereto through the manhole 53 or alternately through an inlet pipe 57 extending from the upper wall of the reactor and the contents may be removed through such manhole or through an outlet pipe 58 connected in the lower wall thereof the contents to flow out by gravity or pressure if desired.

Since it is necessary to subject the materials within the reactor 10 to relatively violent agitation during the chemical reaction thereof there is disposed within such reactor an agitator in the form of a vertical shaft 59 journalled at its lower end in a step bearing 60 and extending through a stuffing box 61 in the upper wall of the shell 51. The shaft 59 is provided with a series of paddles or blades 62 which may be connected by radially extending arms 63 to hubs 64 fixed against rotation on the shaft 59. Shaft 59 may be driven by a suitable power source such as a motor 65 located exteriorly of the reactor 10 and obviously rotation of the shaft 59 will result in rotation of the blades or paddles 62 with a consequent violent agitation of the material within the shell 51.

As best shown in Figs. 2, 3 and 4 the refrigerating coil assembly consists of an inlet header 67 connected with the inlet conduit 28 and the accumulator 25 located directly above the reactor 10 and an outlet header 68 connected to the outlet conduit 29. Headers 67 and 68 are arcuate in formation and extend through a length of approximately 270° or less than 360° and these headers are disposed in a substantially horizontal plane adjacent the upper end of the shell 51. Connected to the lower side of inlet header 67 are a series of spaced downwardly extending relatively short pipes 69 provided with one flange 70 of a flanged joint, the purpose of which will be presently described. Likewise connected to the lower side of outlet header 68 are a series of spaced downwardly extending relatively short lengths of pipe 71 to which are attached flanges 72 forming one part of a flanged joint, the purpose of which will likewise be later described.

The refrigerating coils disposed within the shell 51 of the reactor 10 comprise a plurality of individual coil units 73 and as best shown in Figs. 6 to 9 each of these coil units 73 includes a liquid refrigerant supply conduit 74 provided with a flange 75 for mating with the flange 70 on inlet pipe 69 to provide a supply of liquid refrigerant from inlet header 67. Likewise each individual refrigerating coil unit 73 is provided with a refrigerant outlet pipe 76 having a flange 77 for mating with flange 72 on outlet pipe 71 to provide a path for flow of the gaseous refrigerant to the outlet header 68 and the outlet pipe 29.

With particular reference to Figs. 4 and 5 it should be noted that liquid refrigerant supply conduit 74 for the first cooling coil unit 73 is connected to the inlet header 67 adjacent the inlet connection thereto while the outlet 76 of this same coil unit 73 is connected to the outlet header 68 at the end of such outlet header farthest removed from the outlet pipe 29. Likewise the liquid refrigerant supply conduit 74 of the last individual cooling coil unit 73 in the series is connected to the inlet conduit 67 at the end thereof remote from the inlet connection 28 and the outlet 76 of this last individual coil unit 73 is connected to the outlet header 68 at a point adjacent the outlet pipe connection 29. This arrangement of connections of the individual coil units 73 with the inlet and outlet headers 67 and 68 results in a progressive or continuous flow of refrigerant from inlet to outlet and completely eliminates any traps or dead spots in this circuit. This represents a further feature of the invention which materially contributes to the ability of this system to adequately compensate for rapid changes in temperature and to operate efficiently under extremely wide load conditions.

Each of the individual coil units 73 comprises an upper header 78 to which outlet pipe 76 is attached and a lower header 79 to which liquid refrigerant conduit 74 is attached. The refrigerating coils comprise a series of heat transfer tubes which may be attached by welding or the like to upper header 78 and lower header 79. As shown in the drawing these tubes may comprise an outer pair of tubes 81 curved at their ends to properly enter the upper and lower headers 78 and 79 respectively and a centrally disposed straight tube 82 which is also in communication with the upper and lower headers 78 and 79. Also as shown in the drawing there are four groups of these tubes 81 and 82 although this number is shown for illustrative purposes only and any desired number of such tubes commensurate with the dimensions or cooling requirements of the reactor 10 may be employed.

Each individual coil unit 73 is prefabricated prior to introduction into the reactor 10 and in this operation the upper and lower headers 78 and 79 respectively are provided with the proper openings and the curved tubes 81 are preshaped and the straight tubes 82 cut to the proper length. Prior to attaching the tubes 81 and 82 to the headers 78 and 79 upper and lower bracing members 83 and 84 having apertures therein to receive the tubes 81 and 82 are installed thereon and tack welded in their proper locations. These bracing members 83 and 84 serve to properly space and locate the tubes 81 and 82 and after installation of the bracing members 83 and 84 thereon the tubes 81 and 82 are firmly attached to the upper and lower headers 78 and 79 respectively by welding or the like. At the same time liquid refrigerant supply conduit 74 is attached to the lower header 79 by welding or the like. Obviously all of these joints must be completely leakproof and after completion of the assembly the same is tested under a suitable pressure to insure that all of the welded joints and flanged joints alike are completely leakproof. Since it is sometimes desirable to drain each individual coil unit 73, a removable drain plug 85 is threadedly received in the lower side of lower header 79 and removal of this plug 85 will permit complete draining of the contents of the individual coil unit 73.

In view of the above description and with particular reference to Fig. 5 it will be seen that the liquid supply conduit 74 for each individual coil unit 73 is relatively large in diameter when compared to the tubes 81 and 82 and this feature materially contributes to the efficiency of the device in that the liquid refrigerant may flow downwardly through the supply conduit 74 with little resistance to such flow and as the volume of this liquid refrigerant expands during vaporization thereof this expanded gas will flow upwardly through the relatively larger cross-sectional area provided by the tubes 81 and 82 which will not in any way impede the flow of refrigerant through the cooling unit. This feature represents one of the basic reasons why it is possible to provide an apparatus of minimum height since the accumulator may be placed immediately over the reactor and not at a great distance thereabove since the head required to provide gravity flow of refrigerant through the individual cooling units 73 is relatively small due to the relationship of cross-sectional areas between the liquid supply conduit 74 and the cooling tubes 81 and 82 through which the vaporized refrigerant passes. These relative cross-sectional areas are likewise very important in contributing to the ability of the apparatus to accommodate sudden changes in temperature and to handle an extremely wide variation in refrigeration load requirements.

It will be noted from an inspection of Fig. 3 that the entire cooling coil assembly is suspended from the upper wall of the shell 51 forming the reactor 10, this suspension being by means of bolts or other suitable members 86 connected to bridging support members 87 attached to the inlet and outlet headers 67 and 68 respectively by welding or the like, bolts 86 also engaging hanger brackets 88 which depend from the upper wall of the shell 51 of reactor 10.

It will therefore be seen that the entire refrigerating coil assembly is supported from the upper wall of the shell 51 of the reactor 10 and since the lower ends of the coil assembly are located above the bottom of shell 51 of reactor 10 any expansion or contraction of the coil assembly will be freely permitted without in any way introducing any stress or strain to the shell 51 and consequently there will be no tendency to fracture the vitreous enamel or glass lining 52 of the shell 51. This is extremely important since the materials utilized for the chemical reaction in the reactor 10 may be corrosive in nature and any fracture of the vitreous enamel lining 52 might result in damage to the shell 51.

Since it is necessary that the entire refrigerating coil assembly which includes the individual coil unit 73 and the inlet and outlet headers 67 and 68 be introduced into the reactor 10 through the manhole access opening 53 and the assembly of these elements completed within the reactor 10 the inlet and outlet headers 67 and 68 are provided with flanged joints 89 and 90 respectively which divide these headers into two arcuate sections. It will therefore be seen that these two sections may be easily introduced into the reactor 10 through the manhole access opening 53 and that the same may be coupled together by connecting the flanged joints 89 and 90 after the same are disposed within the reactor. These headers 67 and 68 are thus assembled and attached to the upper wall of the shell 51 by application of the bolts or rods 86 to the bridging support members 87 and the hanger brackets 88 and after the headers are thus installed the individual units 73 are each attached to the headers 67 and 68 by connecting the flanges 70 and 75 of the downwardly extending liquid refrigerant supply conduit 74 and the flanges 72 and 77 of the gaseous refrigerant outlet pipe 76. It will thus be seen that each individual coil unit 73 is suspended from the headers 67 and 68 by their associated flanged joints.

Since the material undergoing chemical reaction within the reactor 10 is violently agitated in a generally circular path by movement of the paddles or blades 64 it is imperative that the individual coil units 73 be braced against lateral or swinging movement within the reactor 10. This is accomplished by means of the bracing members 83 and 84 which are attached by angle irons or the like 91 and 92 respectively to annular rings 93 and 94 which in turn are connected to bracket members 95 and 96 secured to the shell 51 of the reactor 10. Since the upper and lower bracing members 83 and 84 embrace the tubes 81 and 82 of the individual coil units 73 and further since these bracing members 83 and 84 are attached to the shell 51 of the reactor 10 the tube units 73 will be retained against lateral or swinging movement under the action of the material within the reactor 10 which impinges against these tubes due to the action of the agitating blades or paddles 64. The bracing members 83 and 84 will not however preclude expansion or contraction of the tubes 81 and 82 as well as the conduits 74 in a vertical direction.

The disposition of the tubes 81 and 82 forming the individual coil units 73 with relation to the flow of material caused by rotation of the agitating paddles 62 is extremely important in order to insure that maximum contact between the reacting materials and the surfaces of the tubes 81 and 82 as well as with the inner surface of the shell 51 will be obtained. This will result in maximum cooling effect for a given heat transfer area and will also result in requiring less horsepower input for the operation of the agitating blades or paddles 62, since the speed of agitation will not need to be as great as would be the case if incomplete contact between the materials undergoing reaction and the cooling surfaces were obtained.

To accomplish this result the tubes 81 and 82 which comprise groups in each individual tube unit are arranged in such a manner that the plane of each group is substantially perpendicular to a radius of the shell 51. It will be noted from an inspection of Figs. 4 and 5 that during rotation of the shaft 59 and paddles 62 that the materials within the shell 51 undergoing chemical reaction will be moved in a substantially circular path, but that this path of movement will be in a direction tangential to the envelope of the paddles 62, and consequently the path of movement of the materials will be at an angle to the plane of each group of tubes 81 and 82, which will result in complete contact with the heat transfer surface thereof and at the same time each individual cooling unit 73 will in effect provide a fixed baffle within the shell 51 which will further contribute to the agitation of the materials undergoing reaction therein.

An additional cooling effect is provided by the shell 51 in that the materials undergoing reaction within such shell are projected against the inner surface thereof at an angle to the tangent and consequently such materials move around the inner surface of the shell 51 with a rolling motion rather than simply describing a circular path which results in bringing a greater volume of the material into contact with the shell 51 than would be the case if the individual cooling units 73 were not disposed within the shell and the material undergoing reaction simply rotated as a single mass.

It will be seen that by the above described invention there has been provided a relatively simple system for controlling the chemical reaction of a batch of materials contained within a reactor chamber and further, that there has been provided a relatively simple reactor structure in which the means for controlling the reaction takes the form of cooling coil units installed within the reactor chamber, these units all being prefabricated and being introduced into the chamber through the usual manhole access opening and being completely assembled within the chamber without making any welded joints whatsoever, since all of the welded joints are completed prior to introduction of the units into the reactor chamber. Likewise the cooling coils are supported within the chamber in such a manner that expansion and contraction thereof will in no way damage the vitreous enamel coating of the interior walls of the chamber, and furthermore these coils are braced in such a manner that violent agitation of the materials undergoing chemical reaction within the chamber will not cause lateral or swaying movement of the cooling coils, and furthermore such cooling coils serve the purpose of fixed baffles within the chamber in order to contribute materially to the agitating action.

A further very important feature which will be obvious from the above description is the fact that the minimum flow resistance provided by the evaporator structure permits the provision of an extremely compact unit with particular regard to the height of the same in that it is only necessary to provide a relatively low head for the liquid refrigerant flowing into the cooling coils and consequently the accumulator and associated equipment including the liquid level control valve may be positioned directly above the reactor and therefore the total vertical height necessary to accommodate the apparatus will only be the minimum vertical dimension of the reactor plus the minimum vertical dimension of the accumulator and a relatively short conduit connection therebetween. The minimum flow resistance mentioned above also contributes materially to the efficiency of the apparatus and results in obtaining extremely accurate control of the reaction temperatures even though such temperatures may rapidly change and the refrigeration load requirements may cover an extremely wide range.

It has been proven by experimentation that the reaction time utilizing the above system and reactor may be materially reduced and at the same time maintain the reaction temperatures within reasonable limits, and it has further been shown that the total power consumption required for accomplishing the chemical reaction, including the power required for refrigeration and for agitation of the materials undergoing reaction has been materially reduced when compared with reaction systems heretofore employed.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A system for carrying out a chemical reaction process comprising a plurality of reactors, an agitator in each reactor, power means for driving each agitator, vertically disposed cooling coils having an inlet and an outlet header in each reactor, an accumulator disposed above and adjacent each reactor, inlet conduit means connecting the lower portion of said accumulator and said inlet header, outlet conduit means connecting the upper portion of said accumulator and said outlet header, a liquid level control valve connected to each accumulator for controlling the level of liquid therein, a single source of liquid refrigerant connected to each accumulator through a shut-off valve and said liquid level control valve whereby a substantially constant level of liquid refrigerant will be maintained in each accumulator and such liquid will flow by gravity into said coils to substantially flood the same, said refrigerant returning as a gas to said accumulator through said outlet conduit means, any entrained liquid in said gas being separated therefrom in said accumulator and recirculated through said coils, a suction line connecting the upper portion of each accumulator with said refrigerant source through a back pressure control valve, said control valve including an adjustable pressure responsive means for maintaining the temperature in said coils above a predetermined minimum value and a control device connected to said control valve and said shut-off valve operable in response to temperature changes in each reactor for actuating said control valve to control the temperature in said coils above said minimum value in accordance with the heat produced by the reaction process and whereby upon a sudden relatively large decrease in temperature in the reactor said control device will operate to close said shut-off valve and prevent further flow of liquid refrigerant to said accumulator.

2. A system for carrying out a chemical reaction process comprising a reactor, vertically disposed cooling coils in said reactor, an accumulator disposed above and adjacent said reactor, inlet conduit means connecting the lower portion of said accumulator and said coils, outlet conduit means connecting the upper portion of said accumulator and said coils, a liquid level control valve connected to said accumulator for controlling the level of liquid therein, a source of liquid refrigerant connected to said accumulator through a shut-off valve and said liquid level control valve whereby a substantially constant level of liquid refrigerant will be maintained in said accumulator and such liquid will flow by gravity into said coils, said refrigerant returning as a gas to said accumulator through said conduit means, any entrained liquid in said gas being separated therefrom in said accumulator and recirculated through said coils, a suction line connecting the upper portion of said accumulator with said refrigerant source through a back pressure control valve, said control valve including an adjustable pressure responsive means for maintaining the temperature in said coils above a predetermined minimum value and a control device connected to said control valve and said shut-off valve operable in response to temperature changes in said reactor for actuating said control valve to control the temperature in said coils above said minimum value in accordance with the heat produced by the reaction process and whereby upon a sudden relatively large decrease in temperature in said reactor said control device will operate to close said shut-off valve and prevent further flow of liquid refrigerant to said accumulator.

3. A system for carrying out a chemical reaction process comprising a reactor, vertically disposed cooling coils in said reactor, an accumulator disposed above and adjacent said reactor, inlet conduit means connecting said accumulator and said coils, outlet conduit means connecting said accumulator and said coils, a liquid level control valve connected to said accumulator for controlling the level of liquid therein, a source of liquid refrigerant connected to said accumulator through said liquid level control valve whereby a substantially constant level of liquid refrigerant will be maintained in said accumulator and such liquid will flow by gravity into said coils said refrigerant returning to said accumulator through said outlet conduit means, a suction line connecting said accumulator with said refrigerant source through a back pressure control valve, said control valve including an adjustable pressure responsive means for maintaining the temperature in said coils above a predetermined minimum value and a control device connected to said control valve operable in response to temperature changes in said reactor for actuating said control valve to control the temperature in said coils above said minimum value in accordance with the heat produced by the reaction process.

4. A system for carrying out a chemical reaction process comprising a reactor, vertically disposed cooling coils in said reactor, an accumulator disposed above and adjacent said reactor, inlet conduit means connecting said accumulator and said coils, outlet conduit means connecting said accumulator and said coils, a liquid level control valve connected to said accumulator for controlling the level of liquid therein, a source of liquid refrigerant connected to said accumulator through said liquid level control valve whereby a substantially constant level of liquid refrigerant will be maintained in said accumulator and such liquid will flow by gravity into said coils, said refrigerant returning to said accumulator through said outlet conduit means, a suction line connecting said accumulator with said refrigerant source through a back pressure control valve, and a control device connected to said control valve operable in response to temperature changes in said reactor for actuating said control valve to control the temperature in said coils in accordance with the heat produced by the reaction process.

5. A system for carrying out a chemical reaction process comprising a reactor, vertically disposed cooling coils in said reactor, an accumulator disposed above said reactor, inlet conduit means connecting said accumulator and said coils, outlet conduit means connecting said accumulator and said coils, a liquid level control valve connected to said accumulator for controlling the level of liquid therein, a source of liquid refrigerant connected to said accumulator through said liquid level control valve whereby a substantially constant level of liquid refrigerant will be maintained in said accumulator and such liquid will flow by gravity into said coils, said refrigerant returning to said accumulator through said outlet conduit means, a suction line connecting said accumulator with said refrigerant source and means operable in response to temperature changes in said reactor to control the temperature in said coils in accordance with the heat produced by the reaction process.

6. For use in carrying out a chemical reaction process, a reactor, cooling means in said reactor comprising a plurality of vertically disposed individual coil units, an inlet header in said reactor, an accumulator disposed above said inlet header, conduit means connecting said accumulator and said inlet header, separate refrigerant supply conduits connected to said inlet header and each coil unit adjacent the lower end thereof, a plurality of heat transfer tubes extending from the lower end of each coil unit to the upper end thereof, an outlet header, separate outlet pipes connecting the upper ends of the heat transfer tubes in each coil unit with said outlet header, conduit means connecting said outlet header and said accumulator and liquid level control means connected to said accumulator whereby a substantially constant level of liquid refrigerant will be maintained in said accumulator, said liquid refrigerant flowing by gravity through said separate supply conduits to the lower ends of said coil units to substantially flood the same, said heat transfer tubes providing a large cross-sectional area relative to the cross-sectional area of said supply conduit whereby substantially all vaporization of said refrigerant will occur during upward flow thereof through said heat transfer tubes.

7. A reactor for use in carrying out chemical reaction processes comprising a vertically disposed cylindrical shell having upper and lower end walls, a vitreous enamel lining covering the entire inner surface of said shell and said end walls, an access opening in said upper end wall, a cover for said opening providing a fluid-tight closure, hanger brackets secured to said upper end wall and depending therefrom within said shell, inlet and outlet headers of arcuate formation suspended from said hanger brackets, each of said headers comprising at least two arcuate sections connected by flanged joints, a liquid refrigerant inlet conduit connected to said inlet header and extending through said upper end wall, a refrigerant outlet conduit connected to said outlet header and extending through said upper end wall, a plurality of cooling coil units connected to said inlet and outlet headers by flanged joints in depending relation thereto and adjacent the cylindrical wall of said shell and spaced above said lower end wall, said hanger brackets constituting the sole vertical support for said headers and said coil units, each coil unit comprising upper and lower headers, a liquid refrigerant supply conduit communicating with said inlet header and said lower header, a refrigerant outlet pipe communicating with said outlet header and said upper header, a plurality of groups of heat transfer tubes connected to said upper and lower headers, the plane of each group being substantially perpendicular to the radius of said shell, vertically spaced bracing members comprising plates having apertures receiving each tube of each unit, said bracing members being attached to brackets extending inwardly from the cylindrical wall of said shell, and agitating means comprising a vertical centrally disposed shaft journaled in a bearing on said lower end wall and extending through a stuffing box in said upper end wall and paddles carried by said shaft whereby upon rotation of said shaft a mass of fluent material undergoing chemical reaction in said reactor will move in a path tangential to the envelope of said paddles and impinge upon each heat transfer tube and the inner surface of said shell to control the temperature of the reaction.

8. A reactor for use in carrying out chemical reaction processes comprising a vertically disposed cylindrical shell having upper and lower end walls, a fragile lining covering the entire inner surface of said shell and said end walls, an access opening in said upper end wall, hanger brackets secured to said upper end wall and depending therefrom within said shell, inlet and outlet headers of arcuate formation suspended from said hanger brackets, each of said headers comprising at least two arcuate sections connected by flanged joints, a liquid refrigerant inlet conduit connected to said inlet header and extending through said upper end wall, a refrigerant outlet conduit connected to said outlet header and extending through said upper end wall, a plurality of cooling coil units connected to said inlet and outlet headers by flanged joints in depending relation thereto and adjacent the cylindrical wall of said shell and spaced above said lower end wall, said hanger brackets constituting the sole vertical support for said headers and said coil units, each coil unit comprising upper and lower headers, a liquid refrigerant supply conduit communicating with said inlet header and said lower header, a refrigerant outlet pipe communicating with said outlet header and said upper header, a plurality of groups of heat transfer tubes connected to said upper and lower headers, the plane of each group being substantially perpendicular to the radius of said shell, vertically spaced bracing members comprising plates having apertures receiving each tube of each unit, said bracing members being attached to the cylindrical wall of said shell and agitating means disposed within said shell whereby upon operation thereof a mass of fluent material undergoing chemical reaction in said reactor will impinge upon each heat transfer tube and the inner surface of said shell to control the temperature of the reaction.

9. A reactor for use in carrying out chemical reaction processes comprising a vertically disposed cylindrical shell having upper and lower end walls, an access opening in said upper end wall, hanger brackets secured to said upper end wall and depending therefrom within said shell, inlet and outlet headers of arcuate formation suspended from said hanger brackets, each of said headers comprising at least two arcuate sections connected by detachable joints, a liquid refrigerant inlet conduit connected to said inlet header and extending through said upper end wall, a refrigerant outlet conduit connected to said outlet header and extending through said upper end wall, a plurality of cooling coil units connected to said inlet and outlet headers by detachable joints in depending relation thereto and adjacent the cylindrical wall of said shell and spaced above said lower end wall, said hanger brackets constituting the sole vertical support for said headers and said coil units, each coil unit comprising upper and lower headers, a liquid refrigerant supply conduit communicating with said inlet header and said lower header, a refrigerant outlet pipe communicating with said outlet header and said upper header, groups of heat transfer tubes connected to said upper and lower headers, the plane of each group being substantially perpendicular to the radius of said shell, vertically spaced bracing members engaging said tubes and attached to the cylindrical wall of said shell and agitating means disposed within said shell whereby upon operation thereof a mass of fluent material undergoing chemical reaction in said reactor will impinge upon each heat transfer tube and the inner surface of said shell to control the temperature of the reaction.

10. A reactor for use in carrying out chemical reaction processes comprising a vertically disposed cylindrical shell having upper and lower end walls, an access opening in said upper end wall, hanger brackets secured to said upper end wall and depending therefrom within said shell, inlet and outlet headers of arcuate formation suspended from said hanger brackets, a refrigerant inlet conduit connected to said inlet header and extending through said upper end wall, a refrigerant outlet conduit connected to said outlet header and extending through said upper end wall, a plurality of cooling coil units connected to said inlet and outlet headers by flanged joints in depending relation thereto and adjacent the cylindrical wall of said shell and spaced above said lower end wall, said hanger brackets constituting the sole support for said headers and said coil units, each coil unit comprising upper and lower headers, a refrigerant supply conduit communicating with said inlet header and said lower header, a refrigerant outlet pipe communicating with said outlet header and said upper header, a plurality of groups of heat transfer tubes connected to said upper and lower headers, the plane of each group being substantially perpendicular to the radius of said shell, vertically spaced bracing members engaging said tubes and attached to the cylindrical wall of said shell and agitating means disposed within said shell whereby upon operation thereof a mass of fluent material undergoing chemical reaction in said reactor will impinge upon each heat transfer tube and the inner surface of said shell to control the temperature of the reaction.

11. A reactor for use in carrying out chemical reaction processes comprising a vertically disposed shell having upper and lower end walls, inlet and outlet headers disposed in said shell, means for supporting said headers in said shell, said inlet header being closed at the end remote from the inlet connection and said outlet header being closed at the end remote from the outlet connection, a plurality of spaced cooling coil units connected to said inlet and outlet headers in depending relation thereto, each coil unit comprising upper and lower headers, a separate refrigerant supply conduit connecting each lower header and said inlet header, a separate refrigerant outlet pipe connecting each upper header and said outlet header, the supply conduit for the first coil unit being connected to said inlet header adjacent the inlet connection thereto and the outlet pipe for the first coil unit being connected to said outlet header adjacent the closed end thereof, the supply conduit for the last coil unit being connected to said inlet header adjacent the closed end thereof, and the outlet pipe for said last coil unit being connected to said outlet header adjacent the outlet connection thereto whereby refrigerant is progressively supplied to and progressively removed from said coil units and a plurality of groups of heat transfer tubes connected to said upper and lower headers.

12. A reactor for carrying out a chemical reaction process comprising a substantially cylindrical housing having upper and lower end walls in addition to substantially cylindrical side walls, an access opening in said housing, the area of said opening being small compared to the area of any of said walls, a plurality of vertically disposed cooling coil units within said housing, said cooling coil units being arranged in substantially horseshoe configuration, inlet and outlet headers connected to said coils by detachable joints, said inlet and outlet headers being of such size and configuration as to not be capable of passage through said access opening, said headers each being formed of two or more parts connected by detachable joints, the parts being capable of passage through said access opening, said coils being capable of passage through said access opening whereby said coils and said headers may be positioned within and removed from said housing through said access opening.

13. For use in carrying out a chemical reaction process, a reactor, cooling means in said reactor comprising a vertically disposed coil unit having a plurality of heat transfer tubes, a supply conduit extending from the top of said reactor downwardly into said reactor and connected to said coil unit at the lower portion of said reactor, said heat transfer tubes providing a large cross-sectional area relative to the cross-sectional area of said supply conduit whereby substantially all vaporization of said refrigerant will occur during upward flow thereof through said heat transfer tubes, an accumulator disposed above said reactor, supply conduit means connecting said accumulator to said supply conduit, return conduit means connecting the upper portion of said coil unit with the upper portion of said accumulator, and a liquid level control valve connected to said accumulator for maintaining a substantially constant level of liquid refrigerant in said accumulator, such liquid flowing by gravity through said supply conduit means and said supply conduit into the lower end of said coil unit and vaporized refrigerant returning to said accumulator through said return conduit means whereby said coil unit operates fully flooded from said liquid level controlled accumulator.

References Cited in the file of this patent

UNITED STATES PATENTS

| | | |
|---|---|---|
| 1,782,885 | Thomas | Nov. 25, 1930 |
| 1,794,519 | Kavanagh | Mar. 3, 1931 |
| 1,919,029 | Lucke | July 18, 1933 |
| 1,978,382 | Jones | Oct. 23, 1934 |
| 2,097,539 | Tomlinson | Nov. 2, 1937 |
| 2,295,088 | Skleucker | Sept. 8, 1942 |
| 2,329,658 | Simpson | Sept. 14, 1943 |
| 2,337,317 | Eggert | Dec. 21, 1943 |
| 2,416,760 | Lawler et al. | Mar. 4, 1947 |
| 2,595,995 | Thorwid | May 6, 1952 |
| 2,617,264 | McGovern et al. | Nov. 11, 1952 |
| 2,640,686 | Brown | June 2, 1953 |